United States Patent Office 2,738,357
Patented Mar. 13, 1956

2,738,357

AMINOMETHYLSILOXANES

John L. Speier, Pittsburgh, Pa., assignor to Dow Corning Corporation, Midland, Mich., a corporation of Michigan No Drawing. Application June 30, 1950,
Serial No. 171,551

6 Claims. (Cl. 260—448.2)

This invention relates to siloxanes having aminomethyl radicals attached to the silicon through carbon-silicon linkages.

An object of this invention is to prepare novel compositions of matter which possess utilities as intermediates in the formation of organosiloxane resins. Another object is to prepare surface active agents. Another object is to prepare water-soluble siloxanes. Other objects and advantages will be apparent in the following description:

This invention relates to siloxanes of the formula $$(R'_aH_{2-a}NCH_2)R_nSiO_{\frac{3-n}{2}}$$

where $a$ has a value of 0 to 2, $n$ has a value from 0 to 2, R is alkyl or phenyl, and R' is saturated aliphatic or phenyl.

The compounds of this invention are siloxanes which are characterized by having one aminomethyl radical ($H_2NCH_2$—) or substituted aminomethyl radical ($R'HNCH_2$— or $R'_2NCH_2$—) attached to each silicon atom. The remainder of the organic radicals, if any, are alkyl or phenyl. The siloxanes are polymers in which the degree of substitution is from 1 to 3 organic radicals per silicon atom. Thus, this invention includes mono-organosiloxanes having the unit formula $$R'_aH_{2-a}NCH_2SiO_{\frac{3}{2}}$$

diorganosiloxanes having the unit formula $$(R'_aH_{2-a}NCH_2)RSiO$$

and triorganosiloxanes having the unit formula $$(R'_aH_{2-a}NCH_2)R_2SiO_{\frac{1}{2}}$$

and copolymeric siloxanes composed of any combination of the above type units.

In these siloxanes R is alkyl or phenyl. The alkyl radicals include, for example, methyl, ethyl, isopropyl, octadecyl, and terbutyl. R' is any alkyl radical such as methyl, propyl, isopropyl, octadecyl, or any cycloparaffin radical such as cyclohexyl, cyclopentyl, and methylcyclohexyl or R' is a phenyl radical.

The siloxanes of this invention may be prepared by several methods. The most generally applicable is that of reacting a siloxane containing one halogenomethyl radical per silicon atom with ammonia or an amine under anhydrous conditions. Preferably, the halogen is bromine or chlorine. The reaction is best carried out at a temperature of from 50° C. to 150° C. With ammonia and volatile amines it is preferable to carry out the reaction at an elevated pressure. Under the above conditions reaction proceeds smoothly to produce an aminomethylsiloxane and ammonium chloride. The amine may be recovered by filtering the mixture, followed by distillation of the filtrate.

A second method of preparing the siloxanes is that of hydrolyzing an amine of the formula $R_3SiCH_2NR'_aH_{2-a}$ where at least one R is an alkoxy radical. These amines may be prepared, as more fully described in the applicant's copending application filed concurrently herewith, by reacting alkoxychloromethylsilanes with ammonia or amines. The reaction is carried out under anhydrous conditions by heating a mixture of the two at temperatures of from 50° C. to 200° C. The alkoxymethylaminosilanes thus formed are then hydrolyzed, preferably in a basic medium to produce the aminomethylsiloxanes.

A third method for preparing the compounds of this invention is that of treating a trimethylsilylmethylamine with concentrated sulfuric acid at a temperature from 50° C. to 115° C. Under such conditions, one methyl radical is cleaved quantitatively from each silicon atom to produce a siloxane and methane. This method is especially adapted to the preparation of the hexaorganodisiloxanes of this invention.

Copolymers of the aminomethylsiloxanes with conventional siloxanes of the formula $$R''_bSiO_{\frac{4-b}{2}}$$

can be prepared.

R'' is of the group alkyl, monocyclic aryl hydrocarbon and halogenated monocyclic aryl hydrocarbon radicals and $b$ has a value from 0 to 3. In the copolymers there is, on the average, from .9 to 3 organic radicals per silicon atom.

The copolymers are prepared in two ways. The hydrolyzable alkoxyaminomethylsilanes shown above are cohydrolyzed with, for example, alkoxy silanes of the formula $R''_bSi(OR)_{4-b}$, where $b$ has a value from 0 to 3.

Alternatively, the copolymers are prepared by partially chlorinating a methylsiloxane and then reacting the chloromethyl siloxane with amines. For a specific example, the cyclictetramer of dimethylsiloxane is partially chlorinated in the presence of light so that there is from one to two chlorines per tetramer molecule. The product is then reacted with ammonia or an amine by heating a mixture of the two under anhydrous conditions. The resulting product is a siloxane having one aminomethyl radical for each chlorine atom in the original chlorinated tetramer. It should be understood that this procedure is not limited to dimethylsiloxane, but can also be applied to arylmethylsiloxanes.

Any of the aminomethylsiloxanes disclosed herein form salts when reacted with acids or alkyl halides. These salts have the general formula $$(YR'_aH_{2-a}NCH_2)R_nSiO_{\frac{3-n}{2}}$$

where $a$ has a value from 0 to 3 and $n$ has a value from 0 to 2, and Y is an acid anion. Alternatively, the salts are prepared by reacting chloromethylsiloxanes with tertiary amines. These salts are generally water-soluble, and some of them are surface-active agents.

*Example 1.*—10.5 grams of trimethylsilylmethylcyclohexyl-amine was dissolved in 27 cc. of concentrated sulfuric acid and heated at 95° C. until all evolution of methane ceased. The gas was measured in a burette and .0561 mol was found. The acid solution was poured onto 100 grams of ice and made alkaline with cold 25 per cent NaOH. The insoluble organic layer which formed was extracted with ethanol and the extract was acidified with concentrated HCl. A crystalline product was formed which was further purified by mixing with ether and again washing with 25 per cent NaOH. The ether solution was acidified with hydrogen chloride gas and upon evaporation of the solvent the dihydrochloride of the disiloxane diamine was obtained. This material decomposed at 240° C. to 250° C. The salt was washed with 10 per cent NaOH and there was obtained bis(N-cyclohexylaminomethyl) tetramethyldisiloxane having a density at 25° C. of .922, a refractive index at 25° C. of 1.4679 and a specific refraction of .3015.

*Example 2.*—73 grams of N-isopropyl(trimethylsilylmethyl)amine $(CH_3)_3SiCH_2NHCH(CH_3)_2$ was dissolved in 250 grams of concentrated sulfuric acid and heated at approximately 110° C. for five hours. Methane was evolved and the solution was heated at 100° C. for 15 hours after cessation of the gas evolution. The resulting solution was diluted with crushed ice to about twice its volume and then made alkaline with sodium hydroxide. An oil separated and was extracted from the aqueous layer with ether. The ether solution was dried over the anhydrous sodium sulfate and the solvent was removed on a steam bath to yield a clear liquid having the boiling point 132° C. to 140° C. This material was the compound bis(N-isopropylaminomethyl)tetramethyldisiloxane having a refractive index at 25° C. of 1.4267, a density at 25° C. of .850 and a specific refraction of .3020. The compound forms a dihydrochloride which melts 189° C.

*Example 3.*—236 grams of bis-chloromethyltetramethyldisiloxane was mixed with 141 grams anhydrous trimethylamine and heated under pressure to 110° C. to 135° C. for six hours. The product was a solid quaternary chloride having the formula

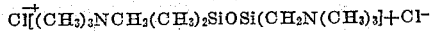

This salt is soluble in water, alcohols, and acetone, and insoluble in ether or hydrocarbons. It is extremely deliquescent and is a strongly surface-active agent.

*Example 4.*—Diethoxymethylsilylmethylamine was hydrolyzed by dissolving it in an excess of water. Upon removal of the alcohol and excess water, a viscous polymeric siloxane having the formula $[(NH_2CH_2)CH_3SiO]_x$ was obtained. This rapidly took up carbon dioxide from the atmosphere to form a brittle white water-soluble carbonate of the formula $[(H_2CO_3 \cdot H_2NCH_2)CH_3SiO]_x$.

*Example 5.*—401 grams of $(ClCH_2(CH_3)_2Si)_2O$ were heated under pressure with 454 g. of isopropylamine for two hours at 130° C. The reaction mixture was diluted with cyclohexane and filtered free of solids. The filtrate was distilled and in addition to other products there was obtained bis(isopropylaminomethyl)tetramethyldisiloxane B. P. 132° C. to 140° C. at 25 mm. The dihydrochloride was formed by reacting the disiloxane with HCl. The salt after recrystallization from acetone had a M. P. 188° C.

*Example 6.*—Triethoxysilylmethyl amine was prepared by reacting triethoxychloromethylsilane with ammonia at 100° C. to 120° C. in an autoclave for 6 hours. The amine was recovered by distillation and boiled 93° C. at 26 mm.

The product was hydrolyzed by adding water thereto and there was obtained a brittle white water-soluble basic polymeric material having the unit formula

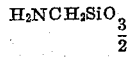

The siloxane also contained silicon bonded hydroxyl groups.

That which is claimed is:

1. A siloxane composed of siloxane units of the formula

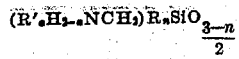

where $a$ has a value from 0 to 2, $n$ has a value from 0 to 2, R is selected from the group consisting of alkyl and phenyl radicals and R' is selected from the group consisting of alkyl, cycloparaffin and phenyl radicals and in said siloxane there being no other organo radicals attached to the silicon.

2. A polymeric siloxane in which each silicon atom has only one organic radical attached thereto by a C to Si linkage, said radical being of the formula

where $a$ has a value from 0 to 2 and R' is an alkyl radical all of the remaining valences of the silicon being satisfied by an oxygen atom.

3. A polymeric siloxane in which the polymer units are of the formula $(R'_aH_{2-a}NCH_2)RSiO$ where $a$ has a value from 0 to 2, R is an alkyl radical and R' is an alkyl radical.

4. A disiloxane of the formula $$[(R'_aH_{2-a}NCH_2)R_2Si]_2O$$

where $a$ has a value from 0 to 2, R is an alkyl radical and R' is an alkyl radical.

5. A salt of the formula

where $a$ has a value from 0 to 3, $n$ has a value from 0 to 2, R is selected from the group consisting of alkyl and phenyl radicals, R' is selected from the group consisting of alkyl, cycloparaffin and phenyl radicals and Y is an acid anion.

6. A polymeric siloxane in which some of the siloxane units are of the formula

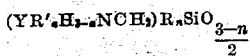

where $a$ has a value from 0 to 2, $n$ has a value from 0 to 2, R' is selected from the group alkyl, cycloparaffin and phenyl radicals and R is selected from the group alkyl and phenyl radicals, the remaining siloxane units of said siloxane being of the formula

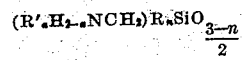

where $b$ has a value from 0 to 3 and R'' is selected from the group alkyl, monocyclicaryl hydrocarbon and halogenated monocyclicaryl hydrocarbon radicals, there being in the siloxane an average of from .9 to 3 of the above defined organic radicals per silicon atom.

References Cited in the file of this patent

UNITED STATES PATENTS

| | | |
|---|---|---|
| 2,462,635 | Haber | Feb. 22, 1949 |
| 2,474,578 | Gilliam | June 28, 1949 |
| 2,557,802 | Sommer | June 19, 1951 |
| 2,557,803 | Sommer | June 19, 1951 |

OTHER REFERENCES

Noll et al.: "Jour. Am. Chem. Soc.," vol. 73 (1951), pp. 3867–3871.